Patented Jan. 1, 1952

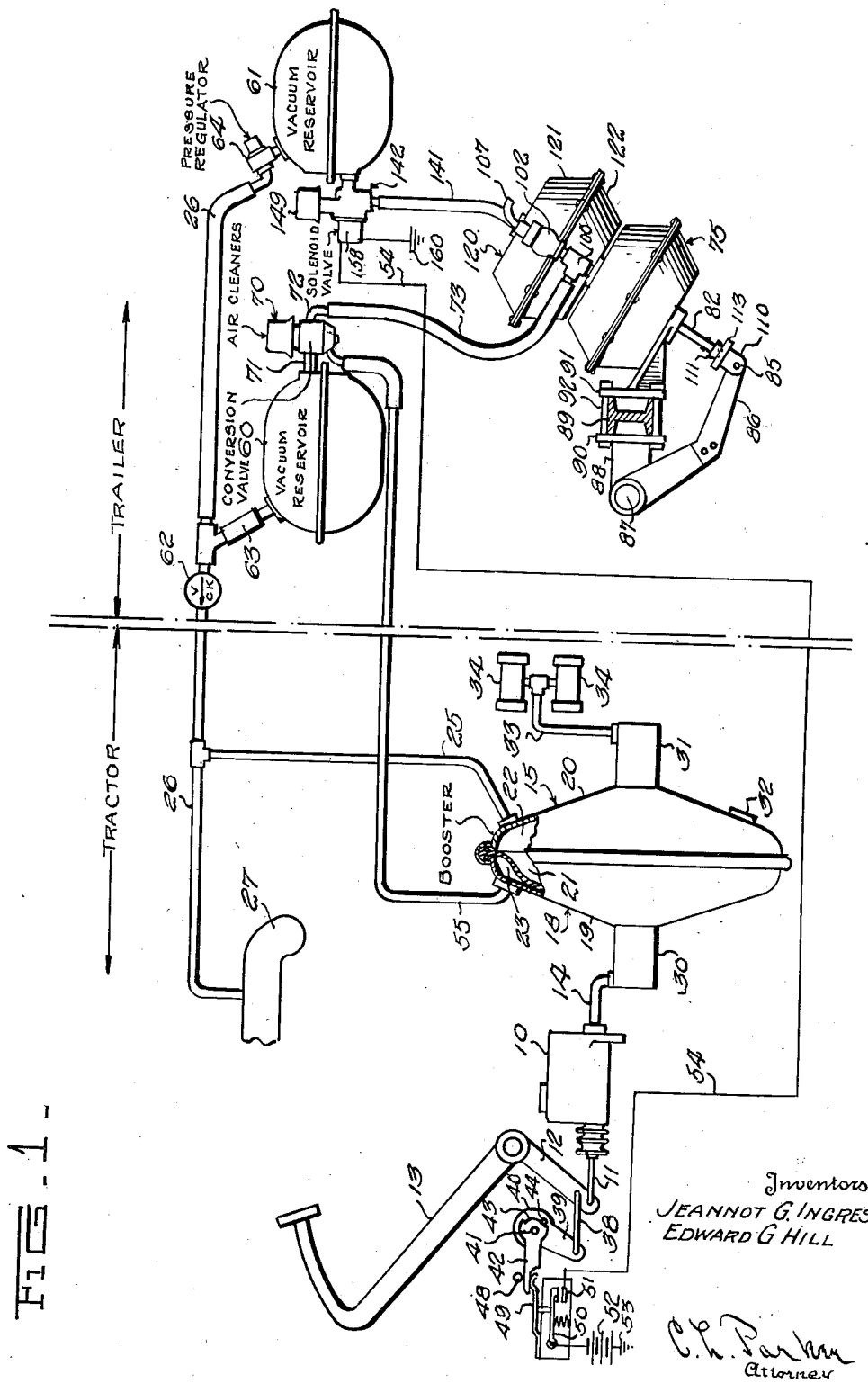

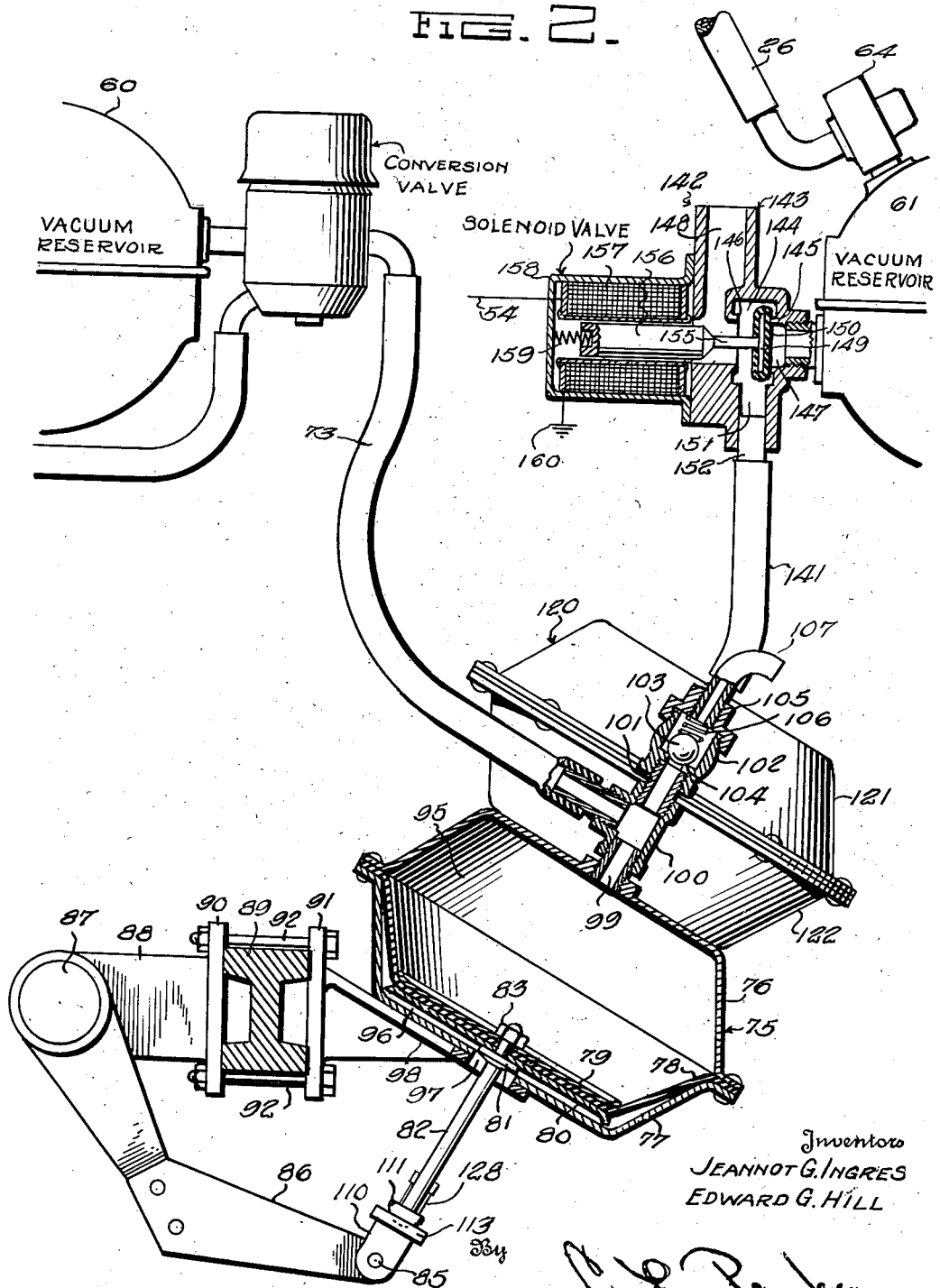

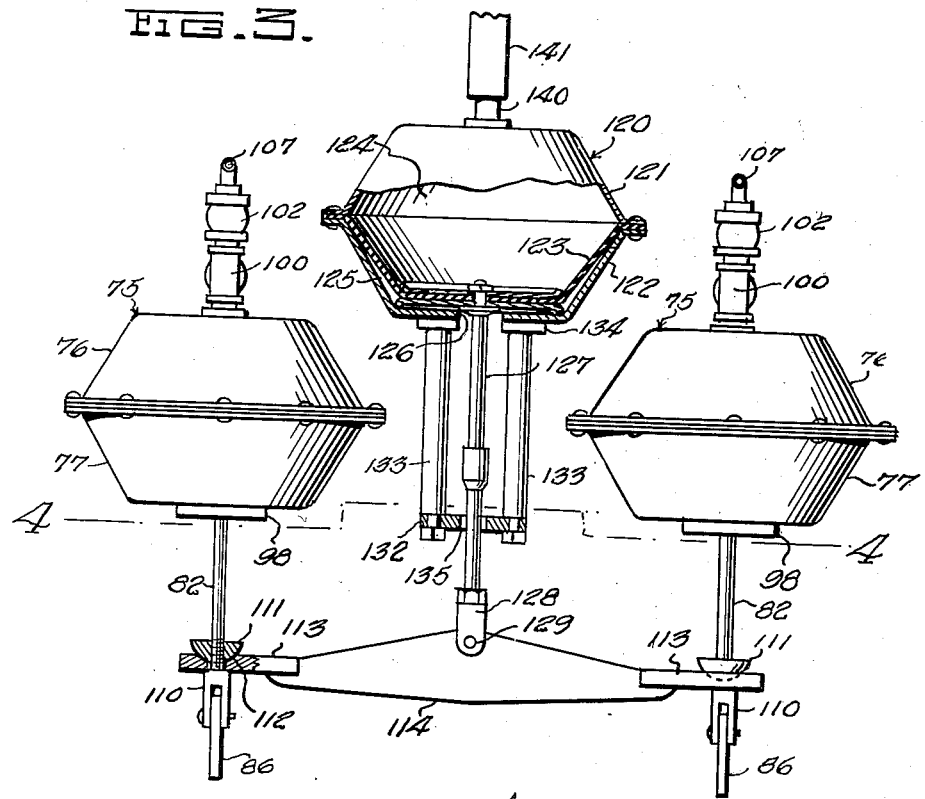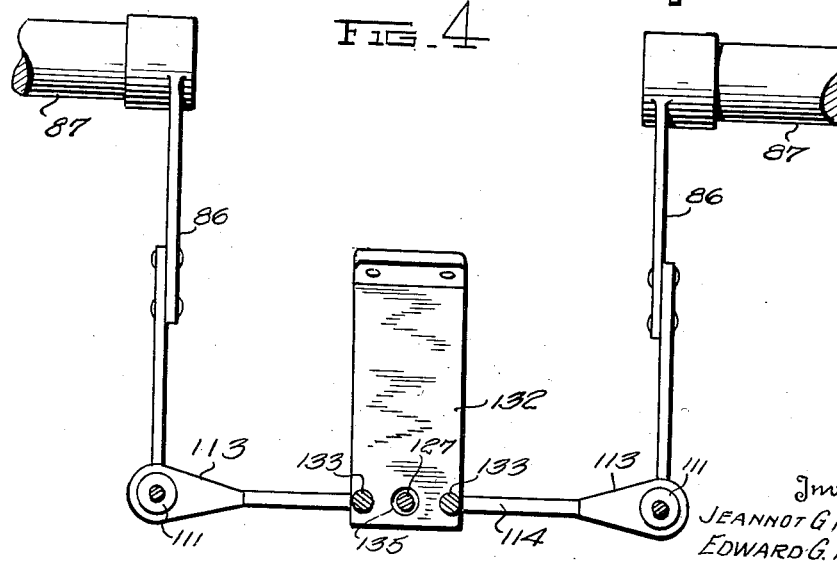

2,581,107

UNITED STATES PATENT OFFICE 2,581,107

TRACTOR-TRAILER BRAKE SYSTEM

Jeannot G. Ingres and Edward G. Hill, Richmond, Va.

Application May 10, 1948, Serial No. 26,194

11 Claims. (Cl. 188—3)

This invention relates to tractor-trailer brake systems, and is an improvement over the construction disclosed and claimed in the application of Jeannot G. Ingres, Serial No. 2,511, filed January 15, 1948, now Patent No. 2,569,610, issued March 8, 1951.

It has been the common practice for a number of years to provide booster brake mechanisms for tractors and to provide on the trailer a power-operated brake system including differential fluid pressure operated motors responsive to energization of the tractor booster so as to apply the trailer brakes to an extent proportional to application of the tractor brakes. Such application of the trailer brakes is conventional, as stated, and offers no substantial problems in the controlling of the motors of the trailer brakes. This is accomplished through the use of a relay valve mechanism commonly referred to as a "conversion valve." Such valve mechanism normally connects the trailer brake motors to the atmosphere to air-suspend them, and upon energization of the tractor booster mechanism, the relay valve mechanism disconnects the trailer brake motors from the atmosphere and connects them to a source of pressure differential, usually vacuum. The relay valve mechanism includes pressure regulating means through which energization of the trailer brake motors takes place to an extent proportional to energization of the tractor booster mechanism.

The serious defect in prior mechanisms of this type lies in the fact that the trailer brake motors cannot be energized simultaneously with the tractor booster mechanism. This is true for the reason that the control line between the tractor booster and the relay mechanism is long, being frequently over 30 feet in length, and a substantial time lag is involved in the passage of air through the control line so as to actuate the relay mechanism. A further serious time lag in vacuum-operated trailer brake motors occurs because of the substantial volumes of air which must be exhausted from the variable pressure chambers of the trailer brake motors before the latter become operative.

In prior systems, it has been the practice to provide a so-called "hand valve" operative by the driver independently of the brake pedal for dumping air into the relay mechanism to actuate the latter and thus energize the trailer brake motors independently of actuation of the tractor booster mechanism. This has been necessary in order to insure the operation of the trailer brakes ahead of the tractor brakes to prevent "jack- knifing." The hand valve permits the driver not only to insure earlier operation of the trailer brakes, but also enables him to use the trailer brakes when a mere brake snubbing operation is desired.

An important object of the present invention is to provide an improved tractor-trailer brake system wherein the time lag involved in the operation of the trailer brakes is eliminated through the provision of auxiliary motor means for initially applying the trailer brakes, thus permitting operation of the usual trailer brake motors after a time interval and without delaying the application of the trailer brakes.

A further object is to provide such a construction wherein the auxiliary trailer brake motor is instantly operative at any time wholly independently of the booster mechanism, without even delaying the trailer brake applications by the time lags involved in operation of the hand valves, thus assuring the driver of complete and instantaneous control over the trailer brakes.

A further object is to provide a tractor-trailer brake system wherein a single auxiliary trailer brake motor not only provides for instantaneous application of the trailer brakes when desired, but also operates the pressure-responsive element of the regular trailer brake motors to pump air therefrom and thus eliminate the later time lag required for the exhausting of air from the regular trailer brake motors upon actuation of the relay mechanism incident to an operation of the booster mechanism.

A further object is to provide a single auxiliary trailer brake operating motor which has novel mechanical connection with the regular trailer brake motors to mechanically operate the latter regardless of pressure conditions therein, to initially apply the trailer brakes and to displace from the regular trailer brake motors substantially all of the air which must be exhausted therefrom upon operation of the relay mechanism in order to initiate normal operation of the regular trailer brake motors.

Other objects and advantages in the invention will become apparent during the course of the following description.

In the drawings we have shown one embodiment of the invention. In this showing Figure 1 is a combined structural, schematic and diagrammatic view of the entire tractor-trailer brake system.

Figure 2 is an enlarged side elevation, somewhat fragmentary, showing the trailer-carried portions of the mechanism, one of the main trailer brake motors and associated elements and the auxiliary motor control valve being shown in section.

Figure 3 is an enlarged substantially rear elevation of the trailer brake motor installation and associated elements, parts being broken away; and Figure 4 is a horizontal sectional view on line 4—4 of Figure 3.

Referring to Figure 1, the numeral 10 designates a conventional hydraulic brake master cylinder having the usual fluid-displacing piston (not shown) operable by a rod 11 connected to the lower arm 12 of a conventional brake pedal 13. Fluid displaced from the master cylinder passes therefrom through a pipe 14 for actuating a booster mechanism indicated as a whole by the numeral 15.

The booster mechanism may be of any desired type, but is preferably of the type disclosed in the prior patent to Rudolph J. Klimkiewicz, No. 2,377,699, granted June 5, 1945. Such a booster mechanism comprises a differential fluid pressure motor 18 formed of opposite casing sections 19 and 20 between which is arranged a pressure operable unit comprising a flexible diaphragm 21. This diaphragm defines with the casing sections a constant pressure chamber 22 and a variable pressure chamber 23 which, in accordance with the disclosure of the Klimkiewicz patent referred to, are normally in communication with each other. The chamber 22 communicates with a pipe 25, tapped into a pipe 26, one end of which leads to the intake manifold 27 of the tractor engine. The chambers 22 and 23 being normally in communication with each other, it will be apparent that the motor 18 is of the vacuum suspended type. Such type booster motor is preferred in connection with the present invention.

The booster mechanism 15 further comprises a low pressure cylinder 30 and a high pressure cylinder 31. The pipe 14 communicates with the interior of the low pressure cylinder 30 to operate the piston (not shown) therein to assist in displacing fluid from the high pressure cylinder 31 and to operate the usual valve mechanism to disconnect the chambers 22 and 23 from each other and to connect the chamber 23 to the atmosphere. In this connection, it will be noted that the booster motor 18 is provided with an air intake 32 preferably provided with a conventional air cleaner (not shown) and adapted to supply air to the chamber 23 in accordance with the operation of the booster control valve mechanism, as disclosed in the Klimkiewicz patent referred to. High pressure hydraulic fluid is conveyed from the high pressure cylinder 31 through suitable pipe connections 33 to the brake cylinders 34 of the tractor, two of these cylinders being shown in Figure 1.

A portion of the apparatus to be described later is electrically controlled, and to this end a switch mechanism is provided to be operated by the driver. This switch may be controlled in any suitable manner, for example by a left foot pedal as disclosed in the pending application of Jeannot G. Ingres, Serial No. 2511, referred to above, or it may be controlled by the conventional brake pedal, as disclosed in the copending application of Jeannot G. Ingres, Serial No. 656,363, filed March 22, 1946, now Patent No. 2,571,885, issued October 16, 1951. In the present instance, the switch mechanism is shown as being controlled by the brake pedal. A link 38 is connected between the depending arm 12 of the brake pedal and a depending arm 39 carried by a disc 40 rotatable on a shaft 41. This shaft carries a switch operating arm 42 frictionally engaging the disc 40 and cut away as at 43 to provide a notch, the ends of which are engageable with a pin 44 carried by the disc 40. It will be apparent that upon depression of the brake pedal 13, the disc 40 will be rotated in a counterclockwise direction, in which case the pin 44 will tend to move away from its associated end of the notch 43 in the position of the parts shown in Figure 1. Frictional engagement of the arm 42 with the disc 40, however, will operate the arm 42 through its limit of movement as described below, whereupon the arm 42 will have its movement arrested while the disc 40 can continue to rotate in frictional engagement therewith through the remainder of the range of movement of the brake pedal 13.

The arm 42 has its upward movement limited by a pin 48, and when the arm moves downwardly incident to operation of the brake pedal 13, movement is transmitted through a switch-operating arm 49 to a switch 50 to move it into engagement with a contact 51. The switch 50 is connected to one terminal of a source 52, usually the vehicle battery, and the other terminal of this source is grounded as at 53. The contact 51 is connected to one end of a wire 54 leading rearwardly to the trailer for a purpose to be described.

All of the parts thus far described are carried by the tractor, as will be clear from an examination of Figure 1, the tractor and trailer parts of the system being indicated by suitable legends at the top of the figure. The variable pressure chamber 23 of the booster motor is connected to one end of a pipe 55 which also extends rearwardly to the trailer, the vacuum pipe 26, control pipe 55 and single wire 54 being the only elements which extend from the tractor to the trailer.

In the use of the present system, two vacuum tanks 60 and 61 are preferably mounted on the trailer, this being done for the purpose of providing vacuum sources having different degrees of vacuum therein for a purpose to be described. The pipe 26 extends rearwardly to the trailer, as stated, and is provided with a normally open check valve 62. The valve 62 can be closed under normal conditions, but it is preferred that it remain normally open to reduce friction incident to the passage of air therethrough in exhausting air from the reservoirs 60 and 61 in the manner referred to below.

A branch pipe 63 connects the pipe 26 to the reservoir 60. This reservoir is in open unrestricted communication with the pipe 26 and the vacuum developed in the reservoir 60 will be the maximum degree as determined by vacuum in intake manifold 27. While the valve 62 is normally open, any break in the line to the left of this valve as viewed in Figure 1 will result in the immediate closing of the valve, thus preventing any increase in pressure in the system because of such break. The pipe 26 extends rearwardly as viewed in Figure 1 for connection with the reservoir 61 through the medium of a pressure control valve 64. Such valve is employed for determining the maximum degree of vacuum in the reservoir 61, and the vacuum in this tank will be substantially less than that maintained in the tank 60 for a purpose which will become apparent.

A relay valve mechanism indicated as a whole by the numeral 70 is associated with the vacuum tank 60. This relay valve mechanism, commonly referred to as a "conversion valve," is conventional and need not be illustrated in detail. In common with conventional valve mechanisms of this type, the mechanism 70 is employed for controlling the energization of trailer brake motors in accordance with the degree of energization of the tractor brake booster mechanism. The relay mechanism 70 is connected by a pipe 71 to the vacuum reservoir 60, and the pipe 55 is also connected to the valve mechanism 70. A trailer brake motor control connection 72 is associated with the relay mechanism 70. Normally the latter mechanism connects the member 72 to the atmosphere, and upon a rise in pressure in the pipe 55 incident to energization of the booster motor 18, the relay mechanism 70 functions to disconnect the member 72 from the atmosphere and connect it to the pipe 71, the degree of such connection depending upon the pressure in the pipe 55 in accordance with conventional practice. Two pipes are connected to the connection 72, one for each of the trailer brake motors. One of these pipes is shown in each of Figures 1 and 2, and is indicated by the numeral 73.

Two main trailer brake operating motors are employed in the present embodiment of the invention and these motors are generally indicated as a whole by the numeral 75. The two motors are shown in Figure 3 in relationship with associated parts of the apparatus, and one of the motors is shown in section in Figure 2 to which reference is now made. Each motor 75 comprises upper and lower casing sections 76 and 77 having peripheral edge portions clamped about the periphery of a diaphragm 78 which constitutes the pressure-responsive element of the motor. This diaphragm has its central portion clamped between plates 79 and 80, the latter of which seats on an annular flange 81 carried by a power-transmitting stem 82. A nut 83 on the upper end of this stem clamps against the plate 79. The lower end of each stem 82 is pivotally connected as at 85 to a crank arm 86 carried by brake operating shaft 87. This shaft is rotatably supported by brackets 88 carried by the axle 89 or any other structural element of the trailer by means of clamps 90 and 91 bolted together as at 92. The clamp 90 may be an integral part of the bracket 88. As show in Figure 4, one of the shafts 87 is associated with each crank 86, and one of these cranks is provided for each trailer brake motor 75.

Each motor 75 is divided by its diaphragm 78 to form a variable pressure chamber 95 and an atmospheric chamber 96. The chamber 96 communicates with the atmosphere through an opening 97 in the casing section 77, this opening also extending through a bracket 98 welded or otherwise secured to the casing 77 and preferably formed integral with the clamp 91 to support the motor 75 in position.

The chamber 95 communicates through a nipple 99 with a T 100, the branch of which communicates with one of the pipes 73. These pipes conveniently may be made of rubber hose stock so as to facilitate their connection to the parts with which they are associated. The run of the T 100 is connected through a nipple 101 with a check valve 102 having a ball check 103 therein engageable with a seat 104. A cap 105 acts as a seat for a compression spring 106 which normally holds the ball 103 on its seat. The cap 105 preferably communicates with the atmosphere through an elbow 107 to prevent foreign material from falling by gravity into the check valve.

As previously stated the rod 82 of each motor 75 is pivotally connected as at 85 to one of the cranks 86. The pivot 85 extends through a yoke 110 carried by each rod 82 and above each yoke is arranged a collar 111 having a hemispherical lower face engageable in a similarly shaped recess 112 formed in a plate 113 carried by each end of a whiffle-tree 114. It will become apparent that the rods 82 are simultaneously operative, and accordingly the whiffle tree travels bodily with these rods. The hemispherical engaging faces of the collars 111 and recesses 112 are to permit a slight rocking of the whiffle tree 114 as may be necessary to compensate for inequalities in the movements of the rods 82.

An auxiliary trailer brake motor indicated as a whole by the numeral 120 is associated with the motors 75, usually in the relationship shown in Figure 3. The motor 120 may be identical with the motors 75, and may comprise upper and lower casing sections 121 and 122 having peripheral flanges clamped against the opposite sides of the peripheral portion of a diaphragm 123. The diaphragm forms with the casing sections 121 and 122 a variable pressure chamber 124 and a constant pressure chamber 125 in fixed communication with the atmosphere through an opening 126 formed in the bottom of the casing section 122. The diaphragm 123 is provided with an axial rod 127 connected thereto, and this connection may be identical with the arrangement shown in Figure 2 for connecting each rod 82 to its associated diaphragm 78. The lower end of the rod 127 carries a yoke 128 straddling and pivotally connected to the whiffle tree 114 as at 129.

In customary installations, the motors 75 are arranged too close together to permit the placing of the auxiliary motor 120 therebetween. For this reason this motor is usually arranged above the motors 75 as shown in Figure 3. For the purpose of supporting the auxiliary motor in such position, a supporting bracket 132, similar to the brackets 98 and supported in the same manner, has fixed thereto the lower ends of parallel supporting posts 133, the upper ends of which carry flanges 134 fixed to the bottom of the casing section 122 in any desired manner. The bracket 132 is provided with a relatively large opening 135 through which the rod 127 passes, this opening and the flexibility of the diaphragm 123 permitting the whiffle-tree to partake of slight swinging movement incident to the swinging of the cranks 86 about the common axis of the shafts 87. The pivot pins 85, of course, partake of the same limited swinging movement and this is permitted by the relatively large openings 97 and through the flexibility of the diaphragms 78 of the two motors 75.

The upper casing section 121 of the auxiliary motor 120 communicates through a nipple 140 with the lower end of a flexible hose 141, and this hose leads to an auxiliary motor control valve mechanism indicated as a whole by the numeral 142. This mechanism comprises a preferably cast body 143 having a substantially central chamber 144 provided at opposite sides with valve seats 145 and 146. A passage 147 leading from the chamber 144 is in fixed communication with the vacuum reservoir 61. The chamber 144 is also adapted to communicate with the atmosphere passage 148, preferably provided with a conventional air cleaner 149 (Figure 1).

A valve element 149, in the form of a disc, is arranged in the chamber 144 and is rubber covered as at 150 to provide resilient valve facings engageable with the seats 145 and 146. The valve facing 150 accordingly determines whether the chamber 144 is connected to the vacuum reservoir 61 or to the atmosphere. A passage 151 communicates with the chamber 144 and is connected by a nipple 152 to the upper end of the pipe 141.

The valve disc 149 is connected to a stem 155 carried by the armature 156 of a solenoid 157 arranged in a housing 158 suitably secured to the valve body 143. A light compression spring 159 urges the armature 156 toward the right as viewed in Figure 2 to tend to maintain the valve 149 on the seat 145. Thus the pipe 141 and the variable pressure chamber 124 of the auxiliary motor are normally connected to the atmosphere. The wire 54 is connected to one terminal of the solenoid 157 and the other terminal of this solenoid is grounded as at 160.

Operation

All of the various parts of the apparatus have been illustrated in their normal or inoperative positions. Assuming that the operator desires to make a regular application of the tractor and trailer brakes, he will depress the brake pedal 13 in the usual manner. The initial movement of the brake pedal will swing the arm 39 and this movement, through frictional engagement of the arm 42 with the disc 40, will close the switch 50 in the manner described. Current will then flow from battery 52 through switch 50, wire 54 and solenoid 157 (Figure 2) and thence back to the battery through grounds 160 and 53. This energizes the solenoid 157, whereupon the armature 156 will move to the left as viewed in Figure 2 and the valve 149 will leave the seat 145 and engage the seat 146. Thus the chamber 144 will be disconnected from the atmosphere and connected to the vacuum reservoir 61 to exhaust air from the motor chamber 124 (Figure 3) through pipe 141. This operation obviously energizes the auxiliary motor 120 and the diaphragm 123 thereof will move upwardly to effect similar movement of the whiffle-tree 114.

The operation referred to will transmit movement to the rods 82 of the main motors 75 and will rock both levers 86. In this connection, it will be noted that the ends of the whiffle-tree contact the collars 111 and thus the rods 82 will be moved vertically and these rods will rock the cranks 86 in the same manner as when the main motors 75 are energized in the manner to be described. Thus a single auxiliary motor will be energized upon initial movement of the brake pedal from its normal position to apply the trailer brakes.

This application of the trailer brakes, of course, will take place to a limited extent to provide a substantial snubbing of such brakes. Obviously a single auxiliary motor 120 of the type illustrated cannot perform the functions of the two main motor 75 to apply the brakes to the same extent as will be done when the main motors are energized. Such full trailer brake application is not desired, and the fuller application of these brakes will take place later when the motors 75 are energized. Whereas the vacuum in the tank in the reservoir 60 corresponds to the maximum vacuum in the intake manifold 27, the pressure regulating valve 64 provides a less degree of vacuum in the reservoir 61, this vacuum preferably being approximately corresponding to 7 inches of mercury.

Accordingly, application of the brakes through the auxiliary motor 120 will occur to less than half the extent which is possible through maximum energization of the motors 75.

Particular attention is invited to the fact that simultaneously with application of the trailer brakes by energization of the motor 120, the diaphragms 78 of the motors 75 will be moved upwardly by the motor rods 82. This operation takes place instantaneously upon initial operation of the brake pedal through energization of the solenoid 157. The valve seats 145 and 146 are of relatively great diameter, thus resulting in extremely rapid evacuation of the auxiliary motor chamber 124. This operation is completed prior to the connection of the pipes 73 to the vacuum reservoir 60 and while the pipes 73 are still connected to the atmosphere. When the diaphragms 78 are moved upwardly in the manner described, air will be rapidly displaced from the variable pressure chambers 95 of the main trailer brake motors 75. The pipes 73 being in communication with the atmosphere, such displaced air could flow through the pipes 73 for discharge to the atmosphere and the system is fully operative in this manner without the use of the ball check valves 103. Due to line friction, etc., the exhausting of the displaced air through pipes 73 is somewhat restricted and it is for this reason that the ball check valves 103 are preferably employed. These balls are very lightly held on their seats by the springs 106 and accordingly air displaced from the motor chambers 95 is relatively freely exhausted.

In this connection it is pointed out that most of the movement of the parts as described takes place to move the brake shoes of the trailer into engagement with the drums. Thereafter, very little movement of the parts is required since the cranks 86 will move only very slightly after the brake shoes have engaged with the drums to build up watever degree of braking force is desired. The operation of the auxiliary motor 120, therefore, mechanically moves the diaphragms 78 of the motors 75 substantially to their limits of movement.

The various operations described above take place substantially instantaneously upon initial movement of the brake pedal 13. After the switch 50 is closed, the arm 42 can partake of no further movement, and the disc 40 will rotate relative to the portion of the arm 42 in contact therewith during the remaining movement of the brake pedal 13. Such movement displaces fluid from the master cylinder 10 into the low pressure cylinder 30 of the booster mechanism 15. In accordance with the disclosure of the Klimkiewicz patent referred to, the booster mechanism will be operated to generate braking pressures in the tractor wheel cylinders 34 proportionate to the extent of operation of the brake pedal 13. Fluid flowing into the low pressure cylinder 30 energizes the booster motor 18 by operating the control valve mechanism therefor as disclosed in the Klimkiewicz patent. The chambers 22 and 23, which are normally in communication with each other, and with the intake manifold through pipes 25 and 26, will be disconnected from each other and air will be supplied to the chamber 23. The increased pressure occurring in the chamber 23 will move the pressure-responsive unit of the booster motor 18 and accordingly the desired braking pressure will be supplied to the wheel cylinders 34.

The increased pressures occurring in the chamber 23 will be communicated through pipe 55 to the relay mechanism 70 in the usual manner. This requires an appreciable length of time due to the length of the pipe 55 and the line friction occurring therein. It is during this interval of time that the auxiliary motor 120 functions in the manner described above.

As soon as the pressure rise in the pipe 55 occurs to the extent upon which the relay mechanism 70 depends for its operation, the pipes 73 will be disconnected from the atmosphere and connected to the reservoir 60 in accordance with the conventional operation of the relay valve mechanism. The connection of the pipes 73 to the vacuum reservoir 60 will result in the evacuation of the chambers 95 of the main trailer brake motors 75. As previously stated, the diaphragms 78 of these motors will have been moved upwardly substantially to their limits of movement during which most of the air will have been displaced from the chambers 95. When the pipes 73 are connected to the reservoir 60, therefore, it is unnecessary to move any great volume of air out of the chambers 95 and the pressures in these chambers will drop very rapidly to establish vacuum in these chambers to an extent proportional to energization of the booster motor 18. Thus the trailer brakes will be properly applied in accordance with the operation of the brake pedal 13 and substantially in proportion to the degree of energization of the booster motor 18.

From the foregoing it will be apparent that the present system functions to positively provide for trailer brake application ahead of tractor brake application, thus preventing dangerous "jack-knifing" through which serious accidents have occurred in tractor-trailer combinations. Full trailer brake application will not occur by energization of the auxiliary motor 120, but the brakes will be applied to an ample extent to prevent "jack-knifing" prior to energization of the main trailer brake motors 75. These motors will be energized more rapidly than is true of conventional systems because of the substantial reduction in the time necessary for evacuating the motor chambers 95 for the reasons stated.

It is the common practice among drivers of tractor-trailer combinations to use the hand valve referred to when it is desired to provide a brake snubbing operation, for example when slowly decelerating vehicle speed or when going down an incline. The same operation may be readily performed with the present system. If such operation is desired, it merely is necessary for the operator to slightly depress the pedal 13 to close the switch 50 without materially displacing hydraulic fluid from the master cylinder 10. Under such conditions, the booster mechanism 15 will remain inoperative, but the auxiliary trailer brake motor 120 will be energized in the manner described above.

As previously stated, the switch 50 may be operated by or independently of the brake pedal 13. When the switch is operated by the brake pedal 13 it not only is highly desirable to close the switch upon initial brake pedal operation but also to open the switch upon the initial releasing movement of the brake pedal. This is accomplished in the present instance through frictional engagement of the arm 42 with the disc 40. After a substantial brake application, initial releasing movement of the brake pedal 13 will turn the disc 40 in a clockwise direction and this disc will frictionally move the arm 42 to release the switch 50 and de-energize the solenoid 157. The valve 149 accordingly returns to its normal position shown in Figure 2 as the result of initial releasing operation of the brake pedal. In this way, the auxiliary motor 120 is de-energized as quickly as it was previously energized, thus permitting the full releasing of all of the brakes without any dragging of the trailer brakes as would occur if the switch 50 were not opened until the brake pedal 13 has returned almost to its completely released position. This particular switch mechanism is disclosed and claimed in the copending application of Jeannot G. Ingres, Serial No. 656,363, referred to above.

The two main motors 75 are shown in Figure 3 in the approximate relative positions they occupy in most trailer installations. The use of the auxiliary motor 120 in conjunction therewith does not disturb such normal relation of parts. The auxiliary motor constitutes an auxiliary installed as an addition to the conventional systems, and the parts of the apparatus fit and operate perfectly in conjunction with such auxiliary systems.

We claim:

1. A vehicle braking mechanism comprising a plurality of differential pressure operated motors each having mechanical connections for operating one of the brakes of the vehicle, means for simultaneously energizing said motors, a single differential fluid pressure operated motor having connection with said mechanical connections to simultaneously apply the vehicle brakes, means for energizing said single motor independently of energization of said plurality of motors, and means having a single manually operable element for controlling both of said motor-energizing means, said element having a normal inoperative position from which it is movable to first operate the motor-energizing means of said single motor and then operate said first named motor-energizing means simultaneously with the operation of the motor-energizing means of said single motor.

2. A vehicle braking mechanism comprising a plurality of differential fluid pressure operated motors each having a mechanical connection for operating one of the vehicle brakes, a single differential fluid pressure operated motor, lever means connecting said single motor to said mechanical connections to simultaneously operate them and apply the brakes independently of energization of said plurality of motors, a pair of control valve mechanisms one for said plurality of motors and the other for said single motor, and means comprising a single manually operable element movable from a normal position and effective upon such movement for first operating the control valve mechanism for said single motor and then both of said control valve mechanisms.

3. A vehicle brake operating mechanism comprising a pair of differential fluid pressure operated motors each having a pressure responsive unit therein, motion transmitting means for connecting each pressure responsive unit to a vehicle brake for operating it, each motor of said pair having a constant pressure chamber, and a variable pressure chamber normally open to the atmosphere, valve means operable for connecting said variable pressure chambers to a source of partial vacuum, and a single differential fluid pressure operated motor connected to both of said motion transmitting means and energizable for simultaneously operating them to apply the brakes and to move said pressure responsive units to displace air from said variable pressure chambers.

4. A vehicle brake operating mechanism comprising a pair of differential fluid pressure operated motors each having a pressure responsive unit therein, motion transmitting means for connecting each pressure responsive unit to a vehicle brake for operating it, each motor of said pair having a constant pressure chamber, and a variable pressure chamber normally open to the atmosphere, valve means operable for connecting said variable pressure chambers to a source of partial vacuum, a single differential fluid pressure operated motor having a pressure responsive unit therein, lever means connecting the pressure responsive unit of said single motor to both of said motion transmitting means to simultaneously operate the latter to apply the brakes and to move the pressure responsive units of the motors of said pair to displace air from said variable pressure chambers, and means for establishing differential pressures in said single motor independently of the connection of said variable pressure chambers to the source of vacuum.

5. A vehicle brake operating mechanism comprising a pair of differential fluid pressure operated motors each having a pressure responsive unit therein, motion transmitting means for connecting each pressure responsive unit to a vehicle brake for operating it, each motor of said pair having a constant pressure chamber, and a variable pressure chamber normally open to the atmosphere, valve means operable for connecting said variable pressure chambers to a source of partial vacuum, a single differential fluid pressure operated motor having a pressure responsive unit therein, lever means connecting the pressure responsive unit of said single motor to both of said motion transmitting means to simultaneously operate the latter to apply the brakes and to move the pressure responsive units of the motors of said pair to displace air from said variable pressure chambers, control means operable for establishing differential pressures in said single motor, and a control mechanism comprising a single manually operable element for first operating said control means to energize said single motor and then operate said control means and said valve means to maintain energization of said single motor and to connect said variable pressure chambers to the source of vacuum.

6. A vehicle brake operating mechanism comprising a pair of differential fluid pressure operated motors each having a pressure responsive unit therein, motion transmitting means for connecting each pressure responsive unit to a vehicle brake for operating it, each motor of said pair having a constant pressure chamber, and a variable pressure chamber normally open to the atmosphere, valve means operable for connecting said variable pressure chambers to a source of partial vacuum, a whiffle-tree lever pivotally connected at its ends to said motion transmitting means, a single differential fluid pressure operated motor having a pressure responsive unit connected to said lever intermediate the ends thereof, and control valve means for establishing differential pressures in said single motor to bodily move said lever and simultaneously operate said motion transmitting connections to apply the brakes and to move the pressure responsive units of the motors of said pair to displace air therefrom independently of the connection of said variable pressure chambers to said source of vacuum.

7. A vehicle brake operating mechanism comprising a pair of differential fluid pressure operated motors each having a pressure responsive unit therein, motion transmitting means for connecting each pressure responsive unit to a vehicle brake for operating it, each motor of said pair having a constant pressure chamber, and a variable pressure chamber normally open to the atmosphere, valve means operable for connecting said variable pressure chambers to a source of partial vacuum, a whiffle-tree lever pivotally connected at its ends to said motion transmitting means, a single auxiliary fluid pressure motor having a pressure movable unit connected to said lever intermediate the ends thereof, said single motor having a constant pressure chamber and a variable pressure chamber, a control valve normally connecting the variable pressure chamber of said single motor to the atmosphere, and means for operating said valve to disconnect the variable pressure chamber of said single motor from the atmosphere and connect it to a source of vacuum to energize said single motor.

8. Apparatus constructed in accordance with claim 7 provided with a mechanism for controlling said valve means and said control valve and comprising a single manually operable element having a normal position from which it is movable to first operate said control valve and then operate said control valve and said valve means.

9. A vehicle brake operating mechanism comprising a pair of differential fluid pressure operated motors each having a pressure responsive member therein, a rod connected to each pressure responsive member, each motor having a constant pressure chamber and a variable pressure chamber normally open to the atmosphere, each of said rods having mechanical connection with a vehicle brake to operate it, valve means operable for connecting said variable pressure chambers to a source of partial vacuum, a whiffle-tree lever pivotally connected at its ends to said rods, a single differential fluid pressure operated motor having a pressure responsive unit connected to said lever intermediate its ends, and a control valve for establishing differential pressures in said single motor to bodily move said lever and simultaneously operate said rods to apply the brakes and to move the pressure responsive members of said pair of motors to displace air therefrom independently of the connection of said variable pressure chambers to said source of vacuum.

10. Apparatus constructed in accordance with claim 9 provided with a mechanism comprising a pedal having a normal position from which it is movable to first operate said control valve and then simultaneously operate said control valve and said valve means.

11. A brake operating mechanism for a tractor-trailer combination wherein the tractor and trailer are each provided with brake operating means, a booster mechanism on the tractor comprising a fluid pressure operated booster motor for operating the tractor brake operating means, a pair of fluid pressure motors on the trailer each having a pressure responsive member therein, motion transmitting means connecting each pressure responsive member to a trailer brake operating means, each motor of said pair having a constant pressure chamber and a variable pressure chamber normally open to the atmosphere, a source of vacuum for the motors of said pair, conversion valve means on the trailer remote from said booster motor responsive to energization of said booster motor to control connection of said variable pressure chambers to said source, a single motor energizable for applying the trailer brakes and to move said pressure responsive members to displace air from said variable pressure chambers, and common manually operable means for energizing said booster motor and said single motor, said common means comprising a manually operable element having a normal position from which it is movable and a mechanism operable by said element throughout movement thereof from its normal position for energizing said single motor, there being a time lag in the energization of said pair of motors due to the remote position of said conversion valve mechanism from said booster motor whereby said single motor will be energized prior to energization of said pair of motors.

JEANNOT G. INGRES.
EDWARD G. HILL.

REFERENCES CITED

The following references are of record in the file of this patent:

UNITED STATES PATENTS

| Number | Name | Date |
| --- | --- | --- |
| 1,650,286 | Livingston | Nov. 22, 1927 |
| 1,824,034 | Cady | Sept. 22, 1931 |
| 2,074,730 | Kerr | Mar. 23, 1937 |
| 2,185,261 | Leupold | Jan. 2, 1940 |
| 2,200,659 | Stehlin | May 14, 1940 |
| 2,232,754 | Winn | Feb. 25, 1941 |
| 2,365,557 | Keith | Dec. 19, 1944 |

FOREIGN PATENTS

| Number | Country | Date |
| --- | --- | --- |
| 279,945 | Italy | Nov. 26, 1930 |